E. E. COOK.
TRANSMISSION MECHANISM.
APPLICATION FILED DEC. 19, 1919.

1,433,071.

Patented Oct. 24, 1922.

INVENTOR
E. E. Cook
BY Munn & Co
ATTORNEYS

Patented Oct. 24, 1922.

1,433,071

UNITED STATES PATENT OFFICE.

ELMER ELLSWORTH COOK, OF CHICAGO, ILLINOIS.

TRANSMISSION MECHANISM.

Application filed December 19, 1919. Serial No. 345,984.

*To all whom it may concern:*

Be it known that I, ELMER E. COOK, a citizen of the United States, and a resident of Chicago, in the county of Cook and State of Illinois, have invented a new and useful Improvement in Transmission Mechanism, of which the following is a full, clear, and exact description.

My invention relates to improvements in transmission mechanisms of the friction drive type and consists in the combinations, constructions, and arrangements herein described and claimed.

An object of my invention is to provide a transmission mechanism of the friction type in which the speed of the driven wheel may be varied from a maximum forward speed to the reverse through all intermediate speeds.

A further object of my invention is to provide a transmission mechanism of the type described in which means is provided for throwing the intermediate friction disk out of enagement with the friction drive wheel and the friction driven wheel and for transmitting the driving force directly from the drive wheel to the driven wheel through direct clutch engagement.

Other objects and advantages will appear in the following specification, and the novel features of the invention will be particularly pointed out in the appended claim.

Figure 1:
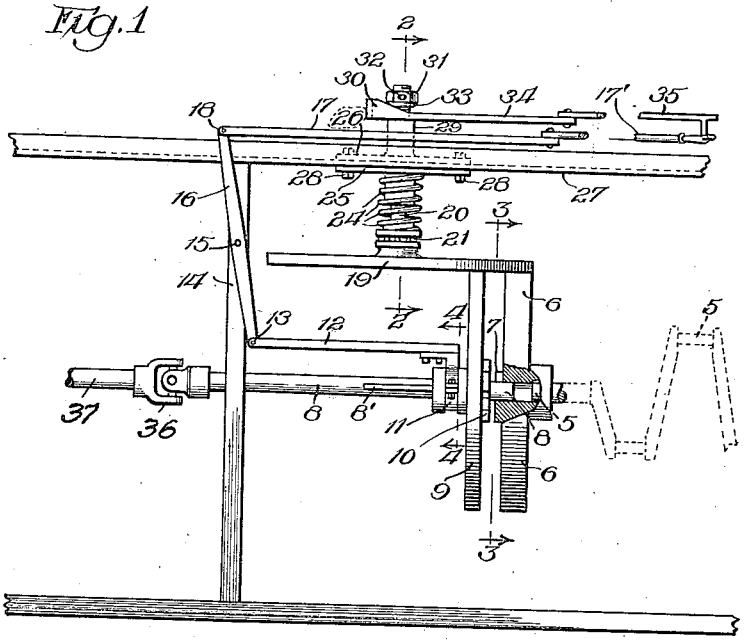
Figure 2:
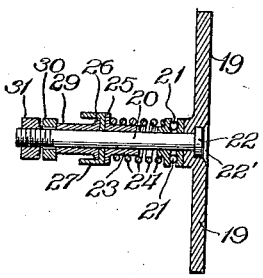
Figure 3:
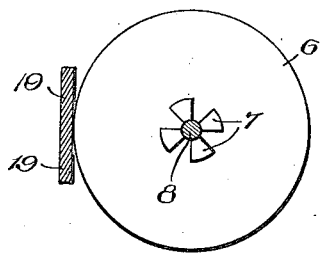
Figure 4:
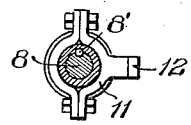

My invention is illustrated in the accompanying drawings, forming part of this application, in which Figure 1 is a plan view of the transmission mechanism, Figure 2 is a detailed sectional view along the line 2—2 of Figure 1, Figure 3 is a detailed sectional view along the line 3—3 of Figure 1, Figure 4 is a detailed sectional view along the line 4—4 of Figure 1.

In carrying out my invention, I make use of the crank shaft 5 of an engine upon which is fixedly fastened a friction drive wheel 6 having upon its hub portion a clutch member 7. A driven shaft 8 has its end bearing within the hub of the friction drive wheel 6. A friction driven wheel 9 is slidably mounted on the shaft 8 and a feather 8' is provided to cause the wheel 9 to turn with the shaft but to slide freely therealong. Rigidly fastened upon the hub portion of the wheel 9 is a clutch member 10 adapted to engage the clutch member 7 when the driven friction wheel 9 is moved as far as possible in the direction of the drive wheel 6. The opposite end of the hub of driven wheel 9 is grooved to accommodate a yoke 11 which is in turn rigidly fastened to rod 12. This rod is pivotally connected at 13 to a lever 14. The latter is pivotally fastened at 15 to a suitable support 16. A rod 17 is pivotally connected at 18 to the other end of lever 14, and may be operated by a hand lever 17'. The shaft 8 is connected by a universal joint 36 to a final drive shaft 37 to effect the actual propulsion of the automobile or vehicle An intermediate friction disk 19 is disposed at right angles to the friction drive wheel 6 and the driven wheel 9. This disk 19 is rotatably mounted upon a stub shaft 20, and is provided with thrust bearings 21. It is retained in place by the flanged head 22 of the stub shaft 20. A recess 22' is centrally provided on the disk 19 in which the rim of driven wheel 9 will turn freely when in neutral. A downward pressure on the thrust bearing 21 is exerted by a spiral spring 24 which is mounted on a sleeve 23. The spring 24 also exerts a pressure against a plate 25 integral with the sleeve 23, through which the stub shaft 20 extends. The shaft 20 also passes through a corresponding plate 26 which is upon the opposite side of the casing or support 27. Bolts 28 clamp plates 25 and 26 securely together and to the casing or support 27. A sleeve 29, integral with the plate 26, presses against a cam member 30 which in turn presses against a nut 31. The latter is securely fastened upon the end of the shaft 20 by means of a cotter pin 32. The nut 31 is uniformly rounded at its bottom 33. The cam member 30 is connected by means of lever 34 to a foot pedal 35.

From the foregoing description of the various parts of the device, the operation thereof may be readily understood.

An actuating force from an engine turns the crank shaft 5 which in turn rotates the friction drive wheel 6 with its rigidly attached clutch member 7. The tension of the spring 24 presses the rim of the intermediate friction disk 19 at right angles against the rim of the friction drive wheel 6. The rim of the driven wheel 9 is also kept in contact with intermediate friction disk 19, since the drive wheel 6 and the driven wheel 9 are equal radially and are positioned in parallel alinement. The point of frictional contact between the rim of the driven wheel 9 and the intermediate disk 19 may be regulated by the hand lever 17' through the medium of the rod 17, the lever 14, the rod 12, and the yoke 11 fastened to the hub of the driven wheel 9. As the hand lever 17' is shifted forward, the driven wheel 9 is pulled along the shaft 8 and consequently the point of contact between the rim of the driven wheel 9 approaches the center of the intermediate disc 19 and finally may reach a point beyond the center of the intermediate disk 19. The rotating drive wheel 6 drives by friction the intermediate disk 19 which in turn drives the driven wheel 9. The speed of the rotation of the driven wheel 9 depends upon the position of the point of contact of its rim with the intermediate disk 19 and may vary from a maximum positive speed when the point of contact is as near the rim of the disk 19 as possible to a minimum positive speed when the point of contact approaches the center of the disk 19. When the point of contact has passed beyond the center of the disk 19, a reverse rotary movement is obtained. The disk 19 may be raised out of frictional engagement with the rims of the wheels 6 and 9 by a pressure upon the foot pedal 35 which operates through the rod 34 to turn the cam member 30 under the rounded edges of the nut 33. The nut 33 is raised, drawing up the shaft 20 together with the intermediate disk 19 and against the influence of the spring 24. The intermediate friction disk 19, being out of engagement with the drive wheel 6 and the driven wheel 9, the driving force may be transmitted directly from the wheel 6 to the wheel 9 through the medium of the locked clutch members 7 and 10, the speed of rotation being controlled entirely now by the actuating force of the engine through the crank shaft 5. The rotary force transmitted to the driven wheel 9 either through the intermediate friction disk 19 or directly from the drive wheel 6 through the clutch members 7 and 10 is communicated along the shaft 8 through the universal joint 36 to the final drive shaft 37. It will be seen that by this invention I have the advantage of both the friction drive transmission and also of a direct drive for the maximum speed.

It will be noted that the cam member 30 is provided with a flat top portion which, when turned under the nut 31, maintains the nut 31 in a lifted position and thus holds the friction disk 19 out of engagement with the drive wheel 6 and the driven wheel 9.

I claim:

The combination with a frame, of a drive shaft, a fly-wheel carried by said drive shaft and having a plurality of recesses and a central bore, a driven shaft carried by said frame and projecting into said bore, a driven wheel of the same diameter as said fly-wheel, having a plurality of projections adapted to enter the recesses of said fly-wheel and being feathered to said driven shaft, a sleeve carried by said frame, a stub shaft slidably disposed in said sleeve and extending at right angles to said drive and driven shafts, a friction disc loosely mounted on the end of said stub shaft and being adapted to frictionally engage with the peripheries of said fly-wheel and said driven wheel, a spring carried by said sleeve for keeping said disc in engagement with said fly-wheel and said driven wheel, anti-frictional means disposed between said disc and said spring, a cam member carried by said stub shaft and bearing against said sleeve, a nut carried by said stub shaft and engaging with said cam member, and means for actuating said cam member and for actuating said driven wheel.

ELMER ELLSWORTH COOK.